(12) United States Patent
Ichimura

(10) Patent No.: US 10,942,361 B2
(45) Date of Patent: Mar. 9, 2021

(54) OPTICAL SYSTEM AND IMAGE PICKUP APPARATUS

(71) Applicant: CANON KABUSHIKI KAISHA, Tokyo (JP)

(72) Inventor: Junya Ichimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 279 days.

(21) Appl. No.: 16/124,874

(22) Filed: Sep. 7, 2018

(65) Prior Publication Data

US 2019/0079305 A1 Mar. 14, 2019

(30) Foreign Application Priority Data

Sep. 11, 2017 (JP) .............................. JP2017-173821

(51) Int. Cl.
*G02B 27/16* (2006.01)
*G02B 27/00* (2006.01)
(Continued)

(52) U.S. Cl.
CPC .............. *G02B 27/16* (2013.01); *G02B 13/02* (2013.01); *G02B 27/0025* (2013.01); *G02B 27/40* (2013.01)

(58) Field of Classification Search
None
See application file for complete search history.

(56) References Cited

U.S. PATENT DOCUMENTS 5,066,113 A * 11/1991 Nakajima .............. G02B 13/16
348/E9.025
9,784,951 B2 10/2017 Ichimura
(Continued)

FOREIGN PATENT DOCUMENTS

CN 102116925 A 7/2011
CN 103443686 A 12/2013
(Continued)

OTHER PUBLICATIONS

Examination Report issued by the Intellectual Property Office of Great Britain dated May 20, 2020 in corresponding GB Patent Application No. 1814573.0.
(Continued)

*Primary Examiner* — Robert E. Tallman
(74) *Attorney, Agent, or Firm* — Carter, DeLuca & Farrell LLP

(57) ABSTRACT

Provided is an optical system including: a first lens unit having a positive refractive power; a second lens unit having a positive refractive power and disposed at the image side of the first lens unit; and a third lens unit having a positive refractive power and disposed closest to the image side, in which intervals between adjacent lens units are changed during focusing. The first lens unit does not move during focusing. The second lens unit moves to the object side along an optical axis during focusing from infinity to a close distance. The second lens unit includes, in order from the object side to the image side, a positive lens, a negative lens, and an aperture stop. The third lens unit includes a positive lens and a negative lens. A length of the third lens unit on the optical axis and an air-equivalent back focus are appropriately set.

14 Claims, 5 Drawing Sheets

(51) Int. Cl.
  *G02B 27/40*  (2006.01)
  *G02B 13/02*  (2006.01)

(56)        References Cited

U.S. PATENT DOCUMENTS

| 2009/0244724 | A1* | 10/2009 | Shibata | G02B 7/08 |
| | | | | 359/792 |
| 2016/0139383 | A1 | 5/2016 | Ichimura | |
| 2017/0199356 | A1 | 7/2017 | Iwamoto | |
| 2018/0024315 | A1* | 1/2018 | Sato | G02B 1/115 |
| | | | | 359/601 |

FOREIGN PATENT DOCUMENTS

| JP | H07199066 A | | 8/1995 |
| JP | 2013025157 A | * | 2/2013 |
| JP | 2013025157 A | | 2/2013 |
| JP | 2013235078 A | | 11/2013 |
| JP | 2014235271 A | | 12/2014 |
| JP | 2016161628 A | | 9/2016 |
| JP | 2016212288 A | | 12/2016 |
| JP | 6191246 B2 | | 9/2017 |

OTHER PUBLICATIONS

Office Action issued by the German Patent Office dated Mar. 30, 2020 in corresponding German Patent Application No. 102018007033.7, with English translation.
Combined Search and Examination Report issued by the Intellectual Property Office of the United Kingdom dated Mar. 6, 2019 in corresponding GB Patent Application No. 1814573.0.
Chinese Office Action dated Dec. 16, 2020, for Corresponding Chinese Patent Application No. 201811053335.4.

* cited by examiner

OPTICAL SYSTEM AND IMAGE PICKUP APPARATUS

BACKGROUND OF THE INVENTION

Field of the Invention

The present invention relates to an optical system and an image pickup apparatus. The optical system is usable, for example, as an image pickup optical system for a digital still camera, a digital video camera, a television camera, a monitoring camera, and the like.

Description of the Related Art

As an image pickup optical system used for an image pickup apparatus, an image pickup optical system of medium telephoto-type is known which has a large aperture ratio, that is, an f-number (Fno) of approximately 1.2 to 2.0 and also has a relatively long focal length. The image pickup optical system of medium telephoto-type has been widely used for portrait photography and indoor sports photography. In addition, there is a demand that such an image pickup optical system be capable of rapidly focusing and have a small variation in aberration during focusing.

As a focusing system having a high focus speed, an inner focus system is known which focuses by moving a small-size light-weight lens unit, which is located in a middle of a lens system. An image pickup apparatus of medium telephoto-type that uses the inner focus system and has a high optical performance is known (Japanese Patent Application Laid-Open No. 2013-25157). Japanese Patent Application Laid-Open No. 2013-25157 discloses an optical system consisting of, in order from the object side to the image side, a first lens unit having a positive refractive power, a second lens unit having a positive refractive power, an aperture stop, and a third lens unit having a positive refractive power, the optical system performing focusing by moving the second lens unit on an optical axis.

Among focusing systems, the inner focus system is capable of focusing with a small-size light-weight lens unit and allow for rapid focusing.

In optical systems of medium telephoto-type having a large aperture ratio and a relatively long focal length, it is important to appropriately select focus lens units and appropriately establish a lens configuration in order to achieve a high optical performance over the entire object distance with a small variation in aberration during focusing.

Particularly, in an optical system of medium telephoto-type having a large aperture, since the depth of field is narrow, it is difficult to obtain a high optical performance in the entire screen without favorably correcting various aberrations such as the axial chromatic aberration and the field curvature, besides the spherical aberration.

SUMMARY OF THE INVENTION

Provided is an optical system including a first lens unit having a positive refractive power, a second lens unit having a positive refractive power and disposed at the image side of the first lens unit and a third lens unit having a positive refractive power and disposed closest to the image side in which an interval between each adjacent ones of the lens units is changed during focusing. The first lens unit does not move during focusing. The second lens unit moves to the object side along an optical axis during focusing from infinity to a close distance. The second lens unit includes, in order from the object side to the image side, a positive lens, a negative lens and an aperture stop. The third lens unit includes a positive lens and a negative lens. The optical system satisfies a conditional expression of $$1.0 < D3/BF < 3.0$$

where D3 represents a length of the third lens unit on the optical axis and BF represents an air-equivalent back focus.

Further features of the present invention will become apparent from the following description of exemplary embodiments with reference to the attached drawings.

DESCRIPTION OF THE EMBODIMENTS

Hereinafter, optical systems and an image pickup apparatus of the present invention will be described. Optical systems of Examples include: a first lens unit having a positive refractive power; a second lens unit having a positive refractive power and disposed at the image side of the first lens unit; and a third lens unit having a positive refractive power and disposed closest to the image side. During focusing, the first lens unit does not move, and during focusing from infinity to a close distance, at least the second lens unit moves to the object side along the optical axis.

Figure 1A:
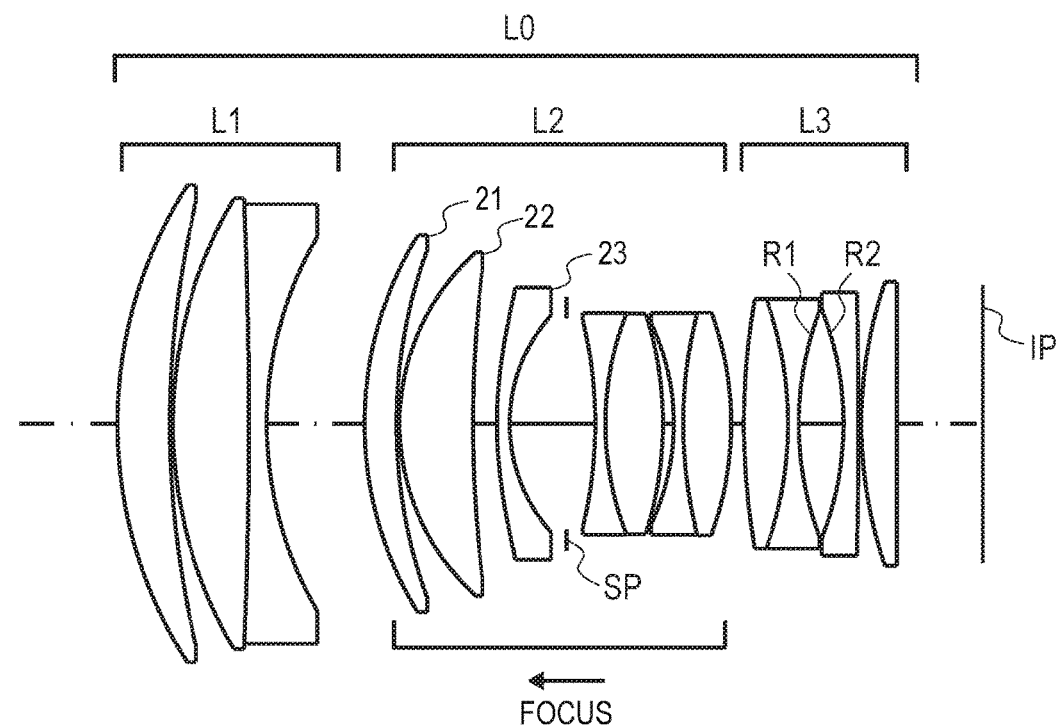
FIG. 1A is a lens sectional view of an optical system of Example 1 when focused on an object at infinity.
Figure 1B:
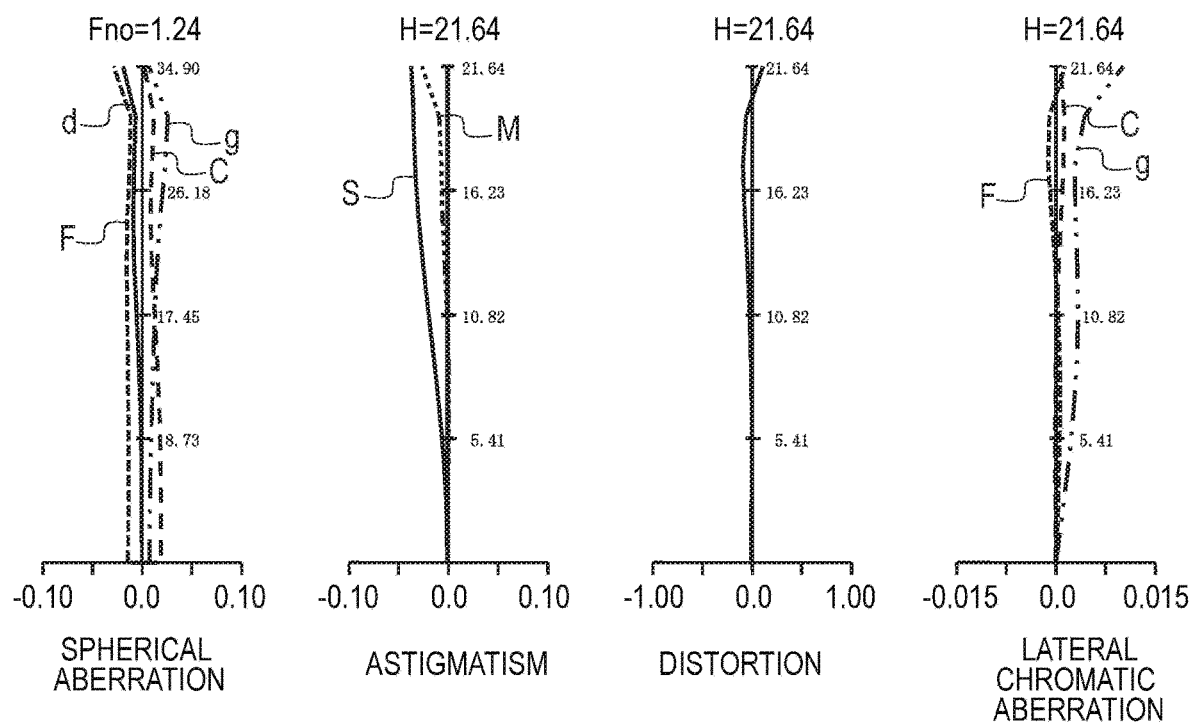
FIG. 1B is a longitudinal aberration diagram of the optical system of Example 1 when focused on the object at infinity.
Figure 2A:
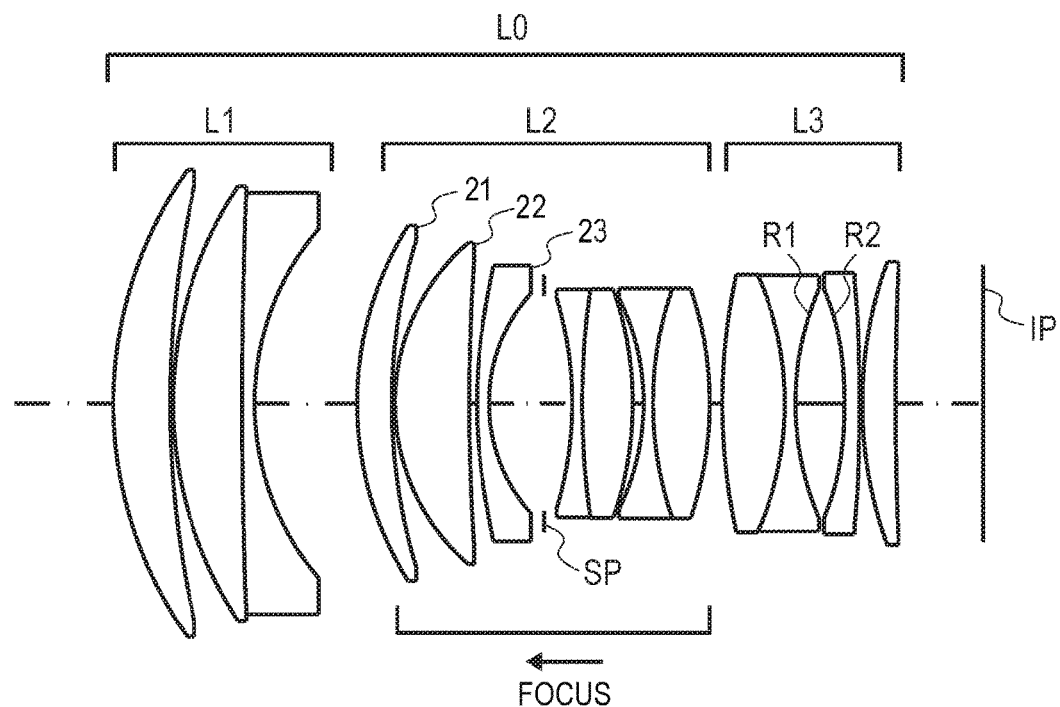
FIG. 2A is a lens sectional view of an optical system of Example 2 when focused on an object at infinity.
Figure 2B:
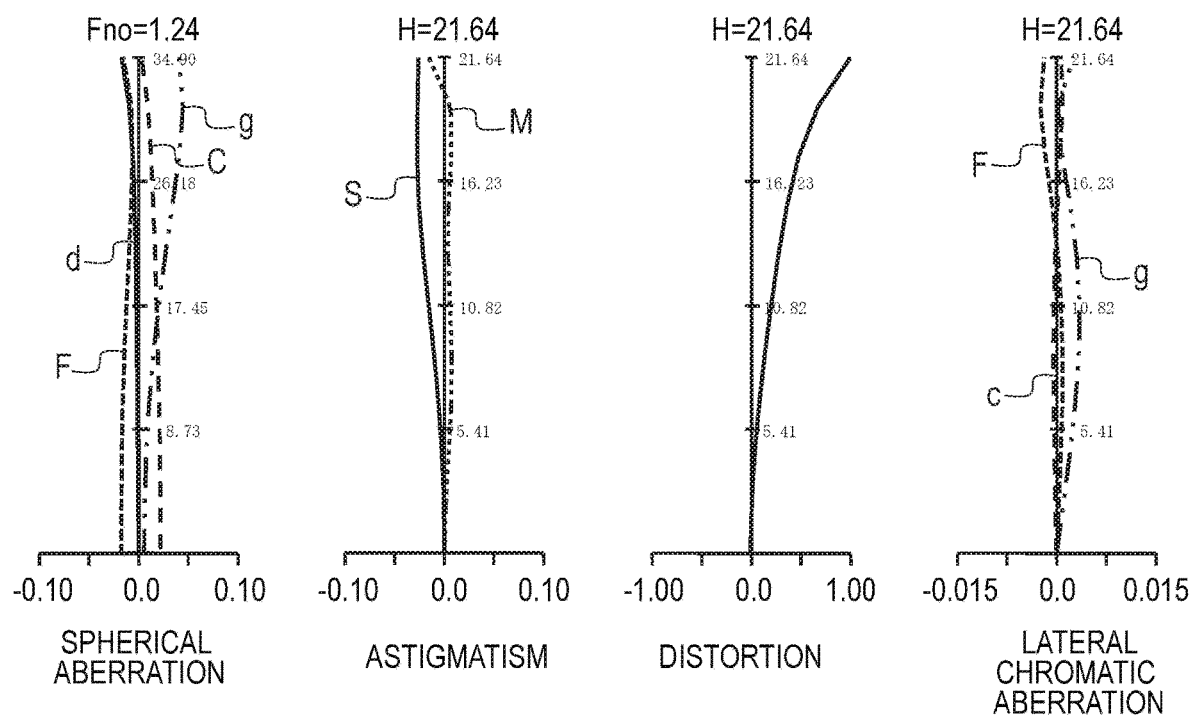
FIG. 2B is a longitudinal aberration diagram of the optical system of Example 2 when focused on the object at infinity.

FIGS. 1A and 1B are a lens sectional view and a longitudinal aberration diagram of an optical system of Example 1 when the optical system is focused at infinity, respectively. Example 1 is an optical system having a focal length of 86.5 and an f-number of approximately 1.24. FIGS. 2A and 2B are a lens sectional view and a longitudinal aberration diagram of an optical system of Example 2 when the optical system is focused at infinity, respectively. Example 2 is an optical system having a focal length of 86.5 and an f-number of approximately 1.24.

Figure 3A:
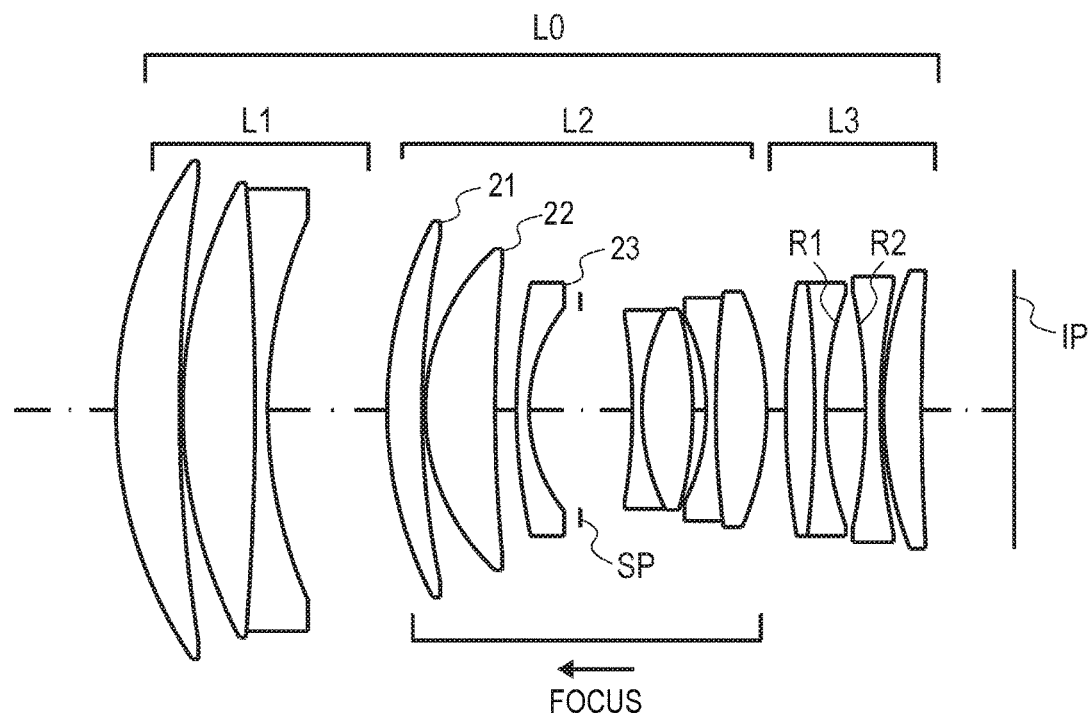
FIG. 3A is a lens sectional view of an optical system of Example 3 when focused on an object at infinity.
Figure 3B:
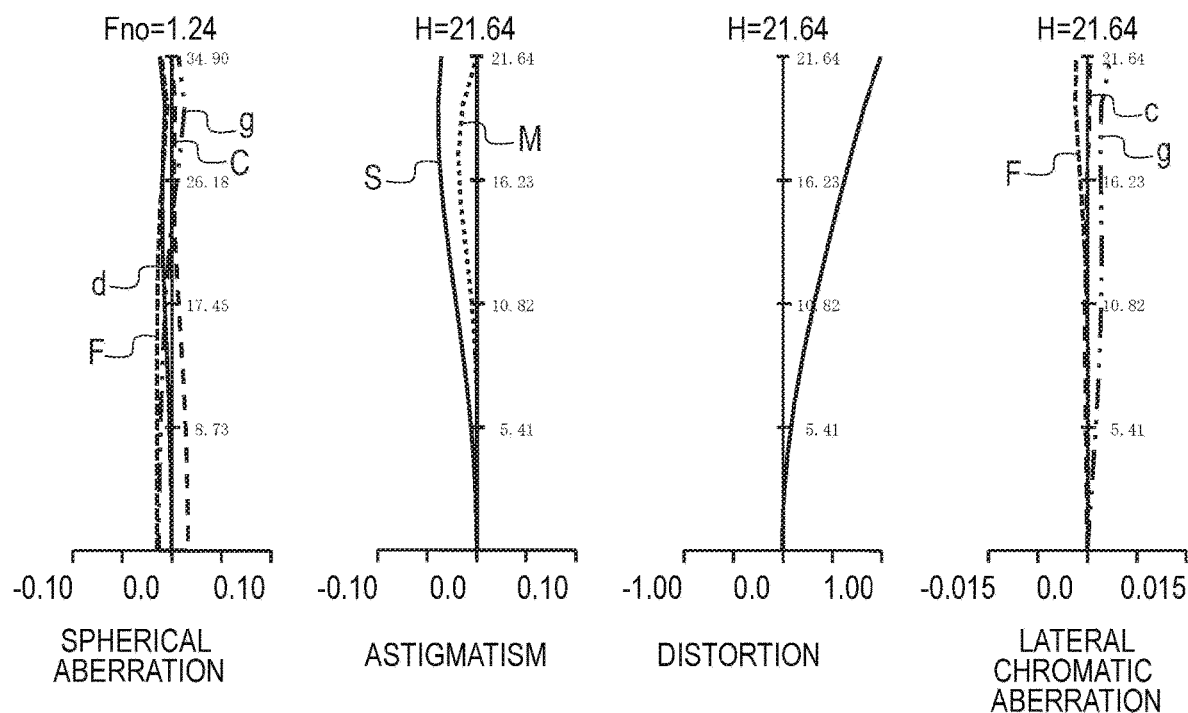
FIG. 3B is a longitudinal aberration diagram of the optical system of Example 3 when focused on the object at infinity.
Figure 4A:
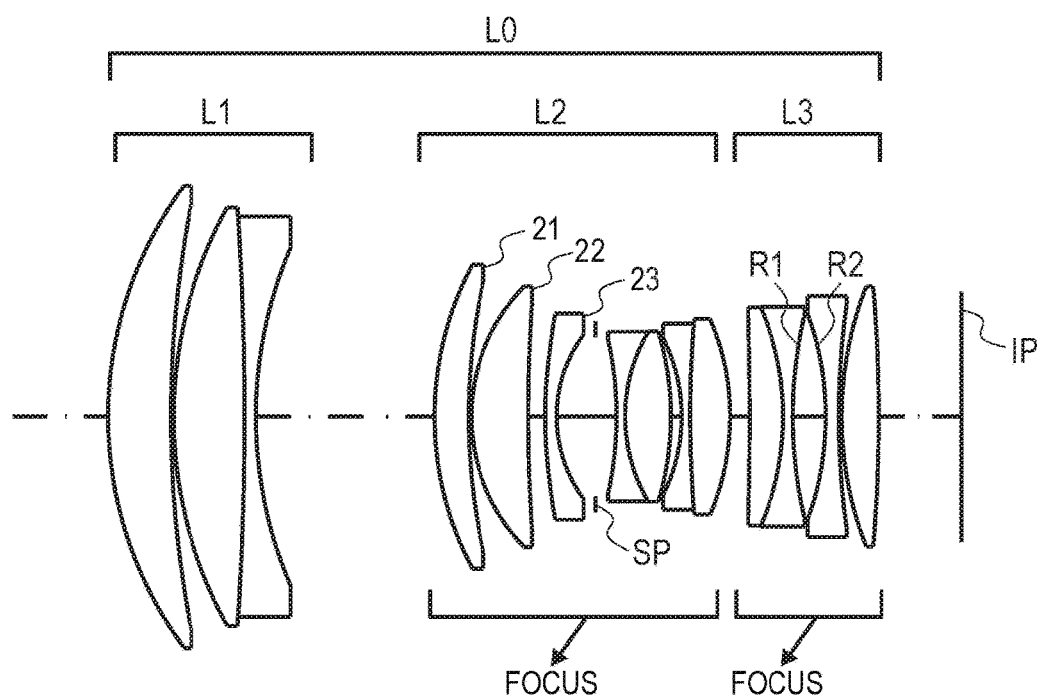
FIG. 4A is a lens sectional view of an optical system of Example 4 when focused on an object at infinity.
Figure 4B:
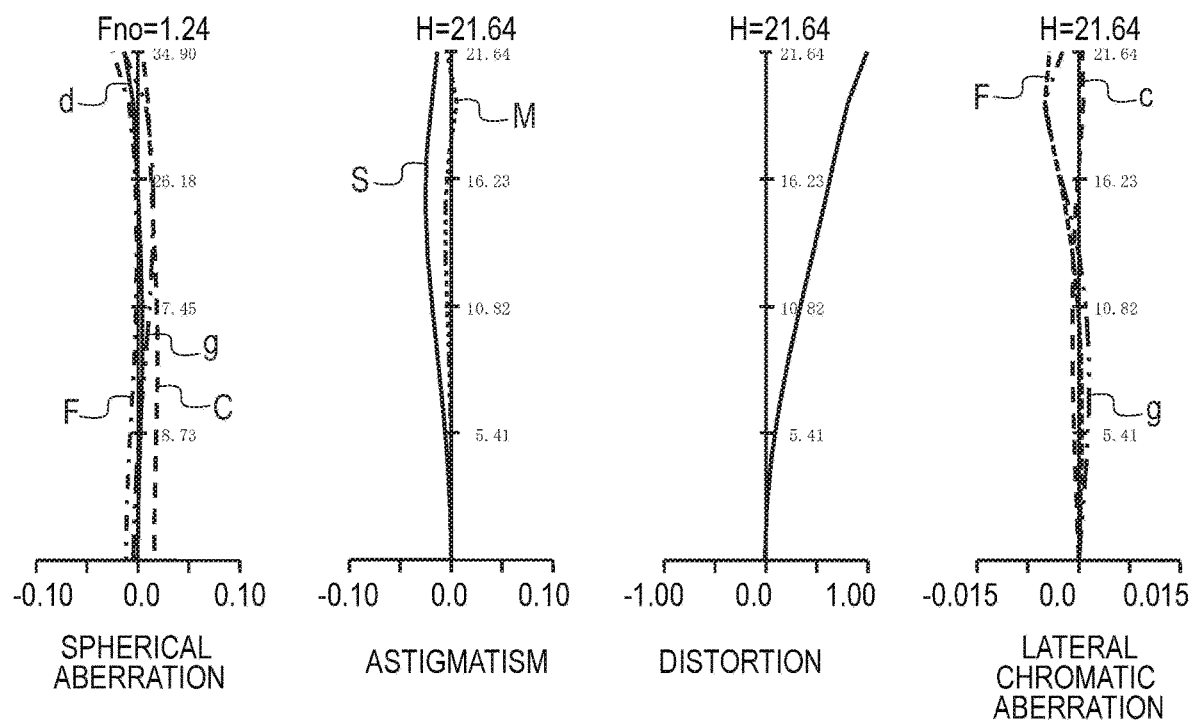
FIG. 4B is a longitudinal aberration diagram of the optical system of Example 4 when focused on the object at infinity.
Figure 5:
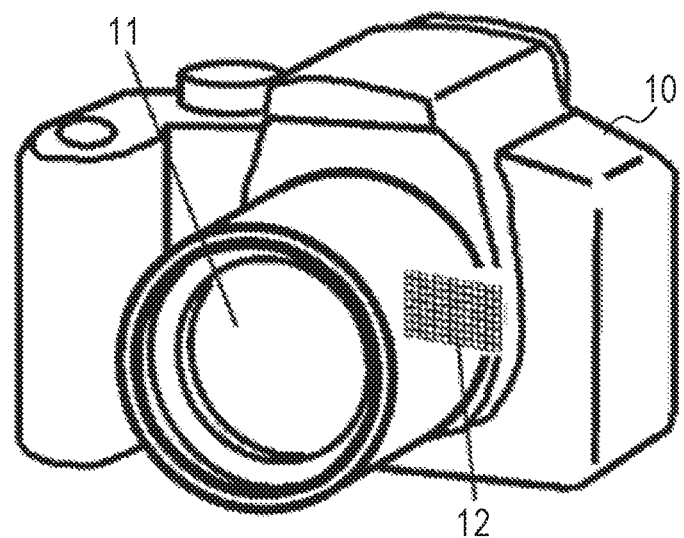
FIG. 5 is a schematic view illustrating main portions of an image pickup apparatus of an Example.

FIGS. 3A and 3B are a lens sectional view and a longitudinal aberration diagram of an optical system of Example 3 when the optical system is focused at infinity, respectively. Example 3 is an optical system having a focal length of 100.0 and an f-number of approximately 1.46. FIGS. 4A and 4B are a lens sectional view and a longitudinal aberration diagram of an optical system of Example 4 when the optical system is focused at infinity, respectively. Example 4 is an optical system having a focal length of 100.0 and an f-number of approximately 1.45. FIG. 5 is a schematic view illustrating main portions of an image pickup apparatus.

In the lens sectional view, the left side is the object side (or the front side, the magnifying side) and the right side is the image side (or the rear side, the reducing side). L0 denotes the optical system. L1 denotes the first lens unit having a positive refractive power; L2, the second lens unit having a positive refractive power; and L3, the third lens unit having a positive refractive power. SP denotes an aperture stop. The arrow regarding the focus indicates the direction of movement of a lens unit during focusing from infinity to the closest distance.

IP denotes an image plane, which corresponds to an image pickup plane of a solid-state image pickup element (a photoelectric conversion element) such as a CCD sensor or a CMOS sensor when the optical system is used as an image pickup optical system for a video camera or a digital still camera.

In the spherical aberration diagram, d represents the d-line (a wavelength of 587.6 nm); g, the g-line (a wavelength of 435.8 nm); C, the C-line (a wavelength of 656.3 nm); and F, the F-line (a wavelength of 486.1 nm). In the astigmatism diagram, M represents the meridional image plane of the d-line; and S, the sagittal image plane of the d-line. The distortion is expressed regarding the d-line. In the lateral chromatic aberration diagram, g represents the g-line; C, the C-line; and F, the F-line. Fno is the f-number, and H is the image height.

The optical system L0 of the Example consists of: in order from the object side to the image side, a first lens unit L1 having a positive refractive power; a second lens unit L2 having a positive refractive power and disposed at the image side of the first lens unit L1; and a third lens unit L3 having a positive refractive power and disposed closest to the image side. During focusing, the interval between each adjacent lens units changes. During focusing from infinity to a close distance, at least the second lens unit L2 moves to the object side along the optical axis. During focusing, the first lens unit L1 does not move.

A medium telephoto-type lens having a so-called large aperture ratio, that is, an Fno of 2.0 or less has a large entrance pupil diameter, and accordingly the front lens effective diameter of the lens tends to be large. In order to move this lens having a large front lens effective diameter during focusing, the focus lens units become quite heavy. For this reason, it is preferable that the first lens unit having a positive refractive power do not move during focusing.

In the optical system of the Example, the second lens unit L2 has a lens configuration similar to a so-called double gauss configuration, where a plurality of lenses are arranged on each of the object side and the image side with the aperture stop SP in between. In this way, the optical performance during focusing is favorably maintained while the high optical performance is ensured. The third lens unit L3 includes a plurality of lenses utilizing its short back focus. This makes it possible to reduce the whole Petzval sum, achieving a favorable image plane characteristics, while enhancing the optical performance during focusing.

The second lens unit L2 includes: a positive lens; a negative lens disposed at the image side of the positive lens; and an aperture stop disposed at the image side of the negative lens. The third lens unit L3 includes: a positive lens; and a negative lens, and the optical system satisfies a conditional expression of $$1.0 < D3/BF < 3.0 \quad (1)$$

where D3 denotes the length of the third lens unit L3 on the optical axis and BF denotes the air-equivalent back focus length. The length of the third lens unit L3 indicates a distance on the optical axis from the object-side lens surface of the lens closest to the object side to the image-side lens surface of the lens closest to the image side in the third lens unit L3.

Conditional Expression (1) allows the chromatic aberration and the Petzval sum to be effectively corrected, by making it possible to effectively arrange the plurality of lenses utilizing the short back focus. If the ratio falls below the lower limit value in Conditional Expression (1), the lens unit length of the third lens unit L3 becomes too short, which makes it difficult to obtain a sufficient refractive power of each lens, resulting in insufficient corrections of the various aberrations. If the ratio exceeds the upper limit value in Conditional Expression (1), this is not preferable because the third lens unit L3 becomes too long, making impossible to obtain a necessary amount of movement of the second lens unit L2.

It is preferable that each Example satisfy one or more of the following Conditional Expressions. Here, f denotes the focal length of the optical system; f1, the focal length of the first lens unit L1; f2, the focal length of the second lens unit L2; and f3, the focal length of the third lens unit L3. The second lens unit L2 includes an aspherical lens including a lens surface of an aspherical surface shape, and Nasp denotes the refractive index of the material of the aspherical lens at the d-line. The third lens unit L3 includes an air lens having a surface consisting of a convex shape on the object side and a surface consisting of a convex shape on the image side, and Ra1 denotes the curvature radius of a lens surface R1 on the object side of the air lens and Ra2 the curvature radius of a lens surface R2 on the image side of the air lens. It should be noted that the statement "includes an air lens having a surface consisting of a convex shape on the object side and a surface consisting of a convex shape on the image side" means to encompass a configuration in which the lens surface R1 on the image side of a certain lens (first lens) is convex toward the object side and the lens surface R2 on the object side of a lens (second lens) disposed adjacent to the image side of the first lens is convex toward the image side.

The second lens unit L2 includes a positive lens 21 disposed closest to the object side in this second lens unit, and θgF21 denotes the partial dispersion ratio between the g-line and the F-line of the material of the positive lens 21. The second lens unit L2 includes, in order from the object side to the image side, the positive lens 21 and a positive lens 22, and θgF22 denotes the partial dispersion ratio between the g-line and the F-line of the material of the positive lens 22.

Then, ng, nF, nd, and nC denote the refractive indices of the material at the g-line, the F-line, the d-line, and the C-line, respectively. In this case, the Abbe number vd and the partial dispersion ratio θgF of the material are expressed by the following expressions:

$$vd=(nd-1)/(nF-nC)$$

$$\theta gF=(ng-nF)/(nF-nC)$$

Here, it is preferable that one or more of the following Conditional Expressions be satisfied:

$$2.0 < f1/f < 10.0 \quad (2)$$

$$0.8 < f2/f < 1.1 \quad (3)$$

$$3.0 < f3/f < 10.0 \quad (4)$$

$$Nasp > 1.70 \quad (5)$$

$$-1 < (Ra1+Ra2)/(Ra1-Ra2) < 5 \quad (6)$$

$$\theta gF21 > 0.61 \quad (7)$$

$$\theta gF22 < 0.55 \quad (8)$$

Next, the technical significance of each of the above-described Conditional Expressions will be described. Conditional Expressions (2) to (4) enable the optical system L0 including a lens configuration in which the second lens unit L2 for focus is sandwiched by the first lens unit L1 having a weak refractive power and the third lens unit L3 having a weak positive refractive power.

The first lens unit L1 contributes to increasing the aperture, and causes the incident light beam to converge to reduce the diameter of the incident light beam after the second lens unit L2. If the ratio falls below the lower limit value in Conditional Expression (2), the positive refractive power of the first lens unit L1, which does not move during focusing, increases relative to the entire refractive power. As a result, the amount of focusing movement of the second lens unit L2 becomes unfavorably too large. If the ratio exceeds the upper limit value in Conditional Expression (2), the on-axis beam less converges. For this reason, the refractive power after the second lens unit L2 increases, making it difficult to correct the spherical aberration and the chromatic aberration.

It is preferable that the focal length of the second lens unit L2 be substantially equal to the focal length of the optical system. If the ratio falls below the lower limit value in Conditional Expression (3), the positive refractive power of the second lens unit L2 becomes unfavorably too strong, making the aberration correction difficult and reducing the space for arranging the third lens unit L3. If the ratio exceeds the upper limit value in Conditional Expression (3), the amount of focusing movement of the second lens unit L2 becomes too large, so that the optical system increases in size.

The third lens unit L3 performs the entire aberration correction and reduces a variation in aberration during focusing to the closest distance, and preferably has a weak positive refractive power. If the ratio falls below the lower limit value in Conditional Expression (4), the illumination at the edge tends to be insufficient. On the other hand, if the ratio exceeds the upper limit value in Conditional Expression (4), the on-axis light beam increases at the second lens unit L2, so that the curvature of the lens surface tends to be large, making it difficult to correct the spherical aberration and the axial chromatic aberration.

In order to reduce the spherical aberration, it is preferable to dispose the aspherical surface in the second lens unit L2, which includes the aperture stop SP. In addition, in order to increase the aspherical surface effect of the aspherical surface shape, it is preferable that the aspherical lens be formed of a material having a high refractive index that satisfies Conditional Expression (5).

The Petzval sum is effectively reduced by making the thickness of the third lens unit L3 large and including the air lens that satisfies Conditional Expression (6). If the ratio falls below the lower limit value in Conditional Expression (6), the Petzval sum increases. On the other hand, if the ratio exceeds the upper limit value in Conditional Expression (6), the curvatures of the lens surfaces of the respective lenses come too close to each other, so that the correction effect by the Petzval sum is reduced.

In the case of an optical system having a large aperture ratio, the depth of field is very shallow. For this reason, being slightly out of focus causes the optical performance of the entire screen to decrease. Particularly when there is a difference in focus between colors due to the axial chromatic aberration, this difference in focus lowers the sense of resolution as color bleeding. For this reason, it is necessary to favorably correct the axial chromatic aberration.

In general, it is known to suppress generation of axial chromatic aberration using a material having a low dispersion for a positive lens and perform achromatization using a material having a high dispersion for a negative lens. However, with this measure only, the chromatic aberration is likely to remain, especially on the short wavelength side.

In view of this, it is preferable for the optical system of each Example to satisfy Conditional Expressions (7) and (8) in the above-described lens configuration. Conditional Expression (7) is to increase the refractive power on the short wavelength side with the positive lens 21 and to reduce the axial chromatic aberration in a wide wavelength band together with the achromatization. Conditional Expression (8) is to reduce the amount of axial chromatic aberration to be generated. It becomes easy to effectively achieve the achromatization by arranging a negative lens having a low refractive index and a high dispersion and a positive lens having a high refractive index and a low dispersion so as to satisfy Conditional Expressions (7) and (8).

The second lens unit L2 preferably includes, in order from the object side to the image side, a positive lens 21, a positive lens 22, a negative lens 23, and an aperture stop. Moreover, the negative lens 23 preferably has a meniscus shape with a convex surface directed to the object side and includes a lens surface having an aspherical surface shape.

The effect of achromatization by the negative lens and the positive lens arranged closer to the image side than the aperture stop SP is increased by causing the light beam incident on the second lens unit L2 to further converge at the positive lens 21, the positive lens 22, and the negative lens 23. In addition, using an aspherical lens as the negative lens 23 makes it efficiently correct spherical aberration, which occurs due to the positive lens 21 and the positive lens 22 which tend to have a large curvature of their lens surfaces, and allows the lens effective diameter after the negative lens 23 to be reduced.

The third lens unit L3 preferably consists of, in order from the object side to the image side, a cemented lens formed by cementing a positive lens and a negative lens, a negative lens, and a positive lens. This configuration makes it easier to efficiently correct the Petzval sum with a smaller number of lenses. The third lens unit L3 preferably includes at least one aspherical surface. Since in an optical system having a short back focus, particularly, the off-axis aberration is likely to increase, the field curvature and the distortion are corrected and further the sagittal flare is effectively corrected by using an aspherical surface.

The first lens unit L1 preferably consists of, in order from the object side to the image side, a positive lens, a positive lens, and a negative lens. This configuration allows the incident light beam to be condensed at the positive lens and to be dispersed at the negative lens to efficiently cause the light beam to converge.

In Examples 2 and 3, the second lens unit L2 moves during focusing. In Example 3, the third lens unit L3 moves along a locus different from that of the second lens unit L2 during focusing. This configuration makes it easier to effectively correct a variation in aberration during focusing.

Next, an Example of a digital still camera (image pickup apparatus) using the optical system of one of Examples as an image pickup optical system will be described using FIG. 5.

In FIG. 5, 10 denotes a camera body; 11, an image pickup optical system formed by the optical system of the Example; 12, a solid-state image pickup element (photoelectric conversion element) such as a CCD sensor or a CMOS sensor that is incorporated in the camera body and receives light of a subject image formed by the image pickup optical system 11.

As described above, it is possible to obtain an image pickup optical system whose entire system is small in size and which has a good optical performance, by applying the optical system of the Example to an image pickup apparatus such as a digital still camera.

The following present specific numerical data of Examples 1 to 4. In each numerical data, i indicates the order counted from the object side; ri, the curvature radius of the i-th optical surface (the i-th surface); di, the distance on the axis between the i-th surface and the (i+1)-th surface. EA indicates the effective diameter (the diameter of a range through which a light beam passes). Moreover, ndi and vdi respectively indicate the refractive index and the Abbe number of the material of an optical member between the i-th surface and the (i+1)-th surface for the d-line. When the X axis is the optical-axis direction, the H axis is a direction perpendicular to the optical axis, the direction of travel of light is positive; R is the paraxial curvature radius; K is the conic constant; A, B, C, and D are aspherical coefficients respectively, the aspherical shape is expressed by the following expression:

$$X = \frac{H^2/R}{1 + \sqrt{1 - (1+K)(H/R)^2}} + AH^4 + BH^6 + CH^8 + DH^{10}.$$

In the following table, * means a surface having an aspherical surface shape. The "e-x" means $10^{-x}$. OBJ indicates the object distance. The object distance 1E+30 means infinity. BF indicates the air-equivalent back focus length (the distance from the lens surface closest to the image side in the optical system to the image plane on the optical axis). The total lens length is a value obtained by adding a value of the back focus BF to the distance from the first lens surface to the last lens surface (the lens surface closest to the image side). In addition, the relations between the above-described Conditional Expressions and numerical data are shown in Table 1.

(Numerical Data 1)

| Unit | i | EA | R | d | glass | nd | vd |
|---|---|---|---|---|---|---|---|
| 1 | 1 | 70.87 | 68.4564 | 8.2000 | SFPM2 | 1.59522 | 67.73 |
|  | 2 | 69.33 | 144.7664 | 0.5000 |  |  |  |
|  | 3 | 66.77 | 68.5861 | 12.0000 | SFPL51 | 1.49700 | 81.54 |
|  | 4 | 65.05 | −800.0000 | 2.8000 | SNBM51 | 1.61340 | 44.27 |
|  | 5 | 58.59 | 57.7047 | 15.3149 |  |  |  |
| 2 | 6 | 55.60 | 55.8845 | 5.0000 | SNPH4 | 1.89286 | 20.36 |
|  | 7 | 54.03 | 78.7959 | 0.5000 |  |  |  |
|  | 8 | 50.60 | 36.0000 | 11.5000 | SFPM2 | 1.59522 | 67.73 |
|  | 9 | 47.96 | 191.1367 | 3.8524 |  |  |  |
|  | 10* | 39.81 | 65.7976 | 2.0000 | SNBH56 | 1.85478 | 24.80 |
|  | 11 | 33.90 | 25.3489 | 8.5000 |  |  |  |
|  | 12 | 33.00 | ∞ | 4.0000 (aperture stop) |  |  |  |
|  | 13 | 32.17 | −67.4064 | 1.6000 | STIM22 | 1.64769 | 33.79 |
|  | 14 | 32.01 | 46.6554 | 9.0000 | SLAH55V | 1.83481 | 42.72 |
|  | 15 | 31.88 | −56.3647 | 1.7000 |  |  |  |
|  | 16 | 31.64 | −36.4167 | 1.5000 | STIM35 | 1.69895 | 30.13 |
|  | 17 | 32.19 | 69.5252 | 7.5000 | TAFD25 | 1.90366 | 31.31 |
|  | 18 | 32.32 | −50.0834 | 2.0000 |  |  |  |
| 3 | 19 | 36.39 | 111.1397 | 7.0000 | TAFD30 | 1.88300 | 40.80 |
|  | 20 | 36.41 | −56.7163 | 1.7000 | STIM1 | 1.62588 | 35.70 |
|  | 21 | 35.61 | 49.5256 | 7.0000 |  |  |  |
|  | 22* | 35.71 | −50.0584 | 2.3000 | LBAL42 | 1.58313 | 59.38 |
|  | 23* | 38.37 | ∞ | 0.5000 |  |  |  |
|  | 24 | 41.47 | 67.7770 | 5.5000 | TAFD35 | 1.91082 | 35.25 |
|  | 25 IMG | 41.59 | 8469.3686 | 13.5279 |  |  |  |

| Aspherical coefficient ||||
|---|---|---|---|
|  | R10 | R22 | R23 |
| R | 65.7976 | −50.0584 | 1E+13 |
| k | 0 | 0 | 0 |
| A | −2.9208E−06 | −2.7151E−06 | −3.0334E−06 |
| B | −4.6570E−10 | 5.6754E−09 | 4.1049E−09 |
| C | 3.5596E−13 | −4.9970E−12 | −4.2155E−12 |
| D | 5.5963E−16 | 1.5780E−14 | 1.1825E−14 |

| Lens interval |||
|---|---|---|
| OBJ | d5 | d18 |
| 1E+30 | 15.315 | 2.000 |
| 4100 | 13.140 | 4.175 |
| 700 | 2.500 | 14.815 |

(Numerical Data 2)

| Unit | i | EA | R | d | glass | nd | νd |
|---|---|---|---|---|---|---|---|
| 1 | 1 | 70.08 | 63.4639 | 9.0000 | SYGH51 | 1.75500 | 52.32 |
|  | 2 | 68.66 | 151.8003 | 0.5000 |  |  |  |
|  | 3 | 65.04 | 61.8854 | 11.0000 | SFPL55 | 1.43875 | 94.66 |
|  | 4 | 63.14 | 800.0000 | 2.0000 | SNBM51 | 1.61340 | 44.27 |
|  | 5 | 55.11 | 42.4980 | 16.2666 |  |  |  |
| 2 | 6 | 52.97 | 52.6458 | 5.5000 | SNPH1W | 1.80809 | 22.76 |
|  | 7 | 51.65 | 88.0595 | 0.5000 |  |  |  |
|  | 8 | 47.85 | 33.5000 | 11.8000 | SFPL51 | 1.49700 | 81.54 |
|  | 9 | 45.40 | 347.7223 | 1.2000 |  |  |  |
|  | 10* | 40.76 | 73.9307 | 2.0000 | SNBH56 | 1.85478 | 24.80 |
|  | 11 | 34.75 | 25.9345 | 8.7000 |  |  |  |
|  | 12 | 34.00 | ∞ | 4.5000 (aperture stop) |  |  |  |
|  | 13 | 33.24 | −57.3706 | 1.6000 | SNBH8 | 1.72047 | 34.71 |
|  | 14 | 33.49 | 127.0378 | 8.0000 | TAFD37 | 1.90043 | 37.37 |
|  | 15 | 33.64 | −54.2677 | 1.7176 |  |  |  |
|  | 16 | 33.35 | −37.6961 | 1.5000 | STIM5 | 1.60342 | 38.03 |
|  | 17 | 33.79 | 54.8160 | 9.0000 | TAFD30 | 1.88300 | 40.80 |
|  | 18 | 33.69 | −55.6956 | 2.0000 |  |  |  |
| 3 | 19 | 38.10 | 94.3506 | 10.0000 | TAFD30 | 1.88300 | 40.80 |
|  | 20 | 37.84 | −49.1069 | 1.7000 | STIM22 | 1.64769 | 33.79 |
|  | 21 | 36.07 | 45.7002 | 7.7933 |  |  |  |
|  | 22* | 36.27 | −68.8229 | 2.3000 | STIM28 | 1.68893 | 31.07 |
|  | 23* | 38.61 | ∞ | 0.5000 |  |  |  |
|  | 24 | 41.95 | 64.7739 | 5.3000 | SNBH56 | 1.85478 | 24.80 |
|  | 25 | 42.01 | 502.6807 | 13.9170 |  |  |  |
|  | IMG |  |  |  |  |  |  |

| Aspherical coefficient | | | |
|---|---|---|---|
|  | R10 | R22 | R23 |
| R | 73.9307 | −68.8229 | 1E+13 |
| k | 0 | 0 | 0 |
| A | −2.34369E−06 | −1.35723E−05 | −0.000011349 |
| B | −4.57974E−10 | 2.80731E−08 | 2.66457E−08 |
| C | 3.89088E−13 | −4.82515E−11 | −4.04256E−11 |
| D | −2.38394E−16 | 4.46053E−14 | 3.66763E−14 |

| Lens interval | | |
|---|---|---|
| OBJ | d5 | d18 |
| 1E+30 | 16.27 | 2 |
| 4000 | 13.88 | 4.39 |
| 700 | 2.5 | 15.77 |

(Numerical Data 3)

| Unit | i | EA | R | d | glass | nd | νd |
|---|---|---|---|---|---|---|---|
| 1 | 1 | 77.18 | 70.7213 | 10.8178 | PCD51 | 1.59349 | 67.00 |
|  | 2 | 75.54 | 249.8665 | 0.5000 |  |  |  |
|  | 3 | 69.06 | 72.9663 | 12.0622 | SFPL55 | 1.43875 | 94.66 |
|  | 4 | 66.92 | −425.5839 | 2.0000 | SNBH5 | 1.65412 | 39.68 |
|  | 5 | 58.70 | 70.5590 | 19.3840 |  |  |  |
| 2 | 6 | 53.22 | 61.3718 | 5.5000 | SNPH4 | 1.89286 | 20.36 |
|  | 7 | 51.55 | 124.5569 | 0.5000 |  |  |  |
|  | 8 | 45.53 | 32.7351 | 11.0000 | SFPL55 | 1.43875 | 94.66 |
|  | 9 | 42.30 | 196.9214 | 2.8412 |  |  |  |
|  | 10* | 36.39 | 74.4943 | 2.0000 | SNBH56 | 1.85478 | 24.80 |
|  | 11 | 31.12 | 24.6139 | 8.7546 |  |  |  |
|  | 12 | 29.57 | ∞ | 7.2975 (aperture stop) |  |  |  |
|  | 13 | 28.12 | −75.8069 | 1.5000 | SNBH5 | 1.65412 | 39.68 |
|  | 14 | 28.40 | 33.7056 | 8.0000 | SLAL14 | 1.69680 | 55.53 |
|  | 15 | 28.65 | −56.3206 | 2.2485 |  |  |  |
|  | 16 | 28.62 | −31.3990 | 1.5000 | STIL1 | 1.54814 | 45.78 |
|  | 17 | 32.03 | 132.0308 | 8.0000 | TAFD30 | 1.88300 | 40.80 |
|  | 18 | 33.97 | −45.1046 | 3.0000 |  |  |  |
| 3 | 19 | 37.27 | 122.2481 | 4.7000 | TAFD45 | 1.95375 | 32.32 |
|  | 20 | 37.24 | −160.7110 | 1.7000 | STIM8 | 1.59551 | 39.24 |
|  | 21 | 36.85 | 58.4894 | 5.7902 |  |  |  |
|  | 22* | 37.05 | −79.5321 | 2.3000 | STIL1 | 1.54814 | 45.78 |

-continued

| | 23 | 39.58 | 74.1827 | 0.5000 | | | |
| | 24 | 41.26 | 56.8279 | 6.0000 | TAFD30 | 1.88300 | 40.80 |
| | 25 | 41.40 | 2949.8738 | 14.0824 | | | |
| | IMG | | | | | | |

| Aspherical coefficient | | |
| --- | --- | --- |
| | R10 | R22 |
| R | 74.4943 | −79.5321 |
| k | 0 | 0 |
| A | −1.90055E−06 | −2.99483E−07 |
| B | 1.00991E−10 | 2.41357E−09 |
| C | −9.37309E−14 | −2.75377E−12 |
| D | 5.65326E−16 | 7.35518E−16 |

| Lens interval | | |
| --- | --- | --- |
| OBJ | d5 | d18 |
| 1.00E+30 | 19.384 | 3 |
| 4106 | 16.355 | 6.029 |
| 706 | 2.5 | 19.884 |

(Numerical Data 4)

| Unit | i | EA | R | d | glass | nd | vd |
| --- | --- | --- | --- | --- | --- | --- | --- |
| 1 | 1 | 76.73 | 67.4702 | 11.0000 | PCD51 | 1.59349 | 67.00 |
| | 2 | 74.70 | 193.2837 | 0.5000 | | | |
| | 3 | 69.32 | 74.8550 | 12.5000 | SFPL55 | 1.43875 | 94.66 |
| | 4 | 66.28 | −550.3944 | 2.0000 | SNBH5 | 1.65412 | 39.68 |
| | 5 | 58.92 | 74.4220 | 30.4001 | | | |
| 2 | 6 | 49.92 | 56.0347 | 6.0000 | SNPH4 | 1.89286 | 20.36 |
| | 7 | 47.83 | 107.8774 | 0.5000 | | | |
| | 8 | 42.65 | 32.3851 | 10.0000 | SFPL55 | 1.43875 | 94.66 |
| | 9 | 39.69 | 277.8320 | 2.9974 | | | |
| | 10* | 33.46 | 79.4323 | 2.0000 | SNBH56 | 1.85478 | 24.80 |
| | 11 | 28.78 | 24.1970 | 6.7447 | | | |
| | 12 | 27.85 | ∞ | 3.5143 (aperture stop) | | | |
| | 13 | 27.17 | −60.7450 | 1.5000 | SNBH5 | 1.65412 | 39.68 |
| | 14 | 27.37 | 29.2377 | 8.0000 | SYGH51 | 1.75500 | 52.32 |
| | 15 | 27.47 | −50.9260 | 1.8825 | | | |
| | 16 | 27.41 | −30.5521 | 1.5000 | STIL1 | 1.54814 | 45.78 |
| | 17 | 30.09 | 210.4584 | 7.0000 | TAFD30 | 1.88300 | 40.80 |
| | 18 | 31.80 | −43.0700 | 3.0000 | | | |
| 3 | 19 | 35.15 | −803.3981 | 6.0000 | TAFD45 | 1.95375 | 32.32 |
| | 20 | 35.51 | −47.2877 | 1.7000 | STIM28 | 1.68893 | 31.07 |
| | 21 | 35.70 | 77.0121 | 5.7610 | | | |
| | 22* | 35.90 | −54.3484 | 2.3000 | LBSL7 | 1.51633 | 64.06 |
| | 23 | 39.37 | 140.3451 | 0.5000 | | | |
| | 24 | 42.36 | 61.7179 | 6.5000 | TAFD35 | 1.91082 | 35.25 |
| | 25 | 42.57 | −261.0109 | 14.4943 | | | |
| | IMG | | | | | | |

| Aspherical coefficient | | |
| --- | --- | --- |
| | R10 | R22 |
| R | 79.4323 | −54.3484 |
| k | 0 | 0 |
| A | −3.22032E−06 | −1.5876E−06 |
| B | 3.14236E−10 | 1.91273E−09 |
| C | −5.64278E−13 | 3.991E−13 |
| D | 1.79148E−15 | −5.06168E−15 |

| Lens interval | | | |
| --- | --- | --- | --- |
| OBJ | d5 | d18 | d25 |
| 1.00E+30 | 30.40 | 3 | 14.50 |
| 4100 | 27.87 | 5.50 | 14.53 |
| 350 | 2.5 | 27.38 | 18.02 |

TABLE 1

| Conditional expression | | Example 1 | Example 2 | Example 3 | Example 4 |
|---|---|---|---|---|---|
| | Focal length f | 86.5 | 86.5 | 100.0 | 100.0 |
| | Fno | 1.24 | 1.24 | 1.46 | 1.45 |
| | Focal length of first lens unit f1 | 380.9 | 431.3 | 269.6 | 261.0 |
| | Focal length of second lens unit f2 | 87.8 | 86.3 | 104.1 | 90.3 |
| | Focal length of third lens unit f3 | 468.3 | 447.5 | 820 | 833.3 |
| | Thickness of first lens unit D1 | 23.5 | 22.5 | 25.38 | 26.0 |
| | Thickness of second lens unit D2 | 56.7 | 56.0 | 59.1 | 51.6 |
| | Thickness of third lens unit D3 | 24.0 | 27.6 | 21.0 | 22.8 |
| | Back focus BF | 13.5 | 13.9 | 14.1 | 14.5 |
| | Ra1 | 49.53 | 45.70 | 54.13 | 77.01 |
| | Ra2 | −50.06 | −68.82 | −84.95 | −54.35 |
| | Total lens length | 135.0 | 138.3 | 142.0 | 148.3 |
| (1) | D3/BF | 1.77 | 1.98 | 1.49 | 1.57 |
| (2) | f1/f | 4.40 | 4.99 | 2.70 | 2.61 |
| (3) | f2/f | 1.02 | 1.00 | 1.04 | 0.90 |
| (4) | f3/f | 5.41 | 5.17 | 8 | 8.33 |
| (5) | Nasp | 1.855 | 1.855 | 1.855 | 1.855 |
| (6) | (Ra1 + Ra2)/(Ra1 − Ra2) | −0.005 | −0.202 | −0.222 | 0.173 |
| (7) | θgF21 | 0.639 | 0.631 | 0.639 | 0.639 |
| (8) | θgF22 | 0.544 | 0.537 | 0.534 | 0.534 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-173821, filed Sep. 11, 2017, which is hereby incorporated by reference herein in its entirety.

What is claimed is:

1. An optical system comprising: a first lens unit having a positive refractive power; a second lens unit having a positive refractive power and disposed at the image side of the first lens unit; and a third lens unit having a positive refractive power and disposed closest to the image side, an interval between each adjacent ones of the lens units being changed during focusing, wherein
the first lens unit is arranged not to move during focusing,
the second lens unit is arranged to move to the object side along an optical axis during focusing from infinity to a close distance,
the second lens unit comprises, in order from the object side to the image side, a positive lens, a negative lens, and an aperture stop,
the third lens unit comprises a positive lens and a negative lens, and
the following conditional expression is satisfied:

$$1.0 < D3/BF < 3.0$$

where D3 represents a length of the third lens unit on the optical axis and BF represents an air-equivalent back focus.

2. The optical system according to claim 1, wherein the following conditional expression is satisfied:

$$2.0 < f1/f < 10.0$$

where f represents a focal length of the optical system and f1 represents a focal length of the first lens unit.

3. The optical system according to claim 1, wherein the following conditional expression is satisfied:

$$0.8 < f2/f < 1.1$$

wherein f represents a focal length of the optical system and f2 represents a focal length of the second lens unit.

4. The optical system according to claim 1, wherein the following conditional expression is satisfied:

$$3.0 < f3/R10.0$$

where f represents a focal length of the optical system and f3 represents a focal length of the third lens unit.

5. The optical system according to claim 1, wherein
the second lens unit comprises an aspherical lens including a lens surface having an aspherical surface shape, and
the following conditional expression is satisfied:

$$Nasp > 1.70$$

where Nasp represents a refractive index of a material of the aspherical lens at a d-line.

6. The optical system according to claim 1, wherein
the second lens unit comprises, in order from the object side to the image side, a first positive lens, a second positive lens, a negative lens, and an aperture stop,
the negative lens comprises a meniscus shape with a convex surface directed to the object side, and
the negative lens comprises a lens surface having an aspherical surface shape.

7. The optical system according to claim 1, wherein
the third lens unit comprises a first lens and a second lens disposed adjacent to the image side of the first lens, a lens surface of the first lens on the image side is convex toward the object side, a lens surface of the second lens on the object side is convex shape toward the image side, and
the following conditional expression is satisfied:

$$-1 < (Ra1+Ra2)/(Ra1-Ra2) < 5$$

where Ra1 represents the radius of curvature of the lens surface of the first lens on the image side and Ra2 represents the radius of curvature of the lens surface of the second lens on the object side.

8. The optical system according to claim 1, wherein the third lens unit consists of, in order from the object side to the image side, a cemented lens formed by cementing a positive lens and a negative lens, a negative lens, and a positive lens.

9. The optical system according to claim 1, wherein the first lens unit consists of, in order from the object side to the image side, a positive lens, a positive lens, and a negative lens.

10. The optical system according to claim 1, wherein
the second lens unit comprises a first positive lens disposed closest to the object side in the second lens unit, and
the following conditional expression is satisfied:

$$θgF21 > 0.61$$

where θgF21 represents a partial dispersion ratio between a g-line and a F-line of a material of the first positive lens.

11. The optical system according to claim 1, wherein
the second lens unit comprises, in order from the object side to the image side, a first positive lens, and a second positive lens, and the following conditional expression is satisfied:

$$\theta gF22 < 0.55$$

where θgF22 represents a partial dispersion ratio between a g-line and a F-line of a material of the second positive lens.

12. The optical system according to claim 1, wherein during focusing, the third lens unit moves along a locus different from that of the second lens unit.

13. The optical system according to claim 1, wherein the optical system consists of, in order from the object side to the image side, the first lens unit, the second lens unit, and the third lens unit.

14. An image pickup apparatus comprising:
an optical system; and
an image pickup element that receives light of an image formed by the optical system, wherein
the optical system comprises: a first lens unit having a positive refractive power; a second lens unit having a positive refractive power and disposed at the image side of the first lens unit; and a third lens unit having a positive refractive power and disposed closest to the image side, an interval between each adjacent ones of the lens units being changed during focusing,
the first lens unit is arranged not to move during focusing,
the second lens unit is arranged to move to the object side along an optical axis during focusing from infinity to a close distance,
the second lens unit comprises, in order from the object side to the image side, a positive lens, a negative lens, and an aperture stop,
the third lens unit comprises a positive lens and a negative lens, and
the following conditional expression is satisfied:

$$1.0 < D3/BF < 3.0$$

where D3 represents a length of the third lens unit on the optical axis and BF represents an air-equivalent back focus.

* * * * *